United States Patent [19]

Kelemen et al.

[11] Patent Number: 5,512,725
[45] Date of Patent: Apr. 30, 1996

[54] METHOD FOR MAINTAINING INTEGRITY OF A POSITIONER STACK USING A WELDING PROCESS

[75] Inventors: Bradley D. Kelemen, Santa Cruz; Mike Raffetto, Scotts Valley, both of Calif.

[73] Assignee: Seagate Technology, Inc., Scotts Valley, Calif.

[21] Appl. No.: 152,957

[22] Filed: Nov. 12, 1993

[51] Int. Cl.[6] .................................................. B23K 26/00
[52] U.S. Cl. ............................. 219/121.64; 360/106
[58] Field of Search .................. 219/12.63, 12.64; 360/103, 104, 105, 106; 310/13; 228/164, 167, 178

[56] References Cited

U.S. PATENT DOCUMENTS

| | | | |
|---|---|---|---|
| 4,327,275 | 4/1982 | Asaba et al. | 219/121.64 |
| 4,933,791 | 6/1990 | Cheng | 360/104 |
| 5,172,286 | 12/1992 | Jurgenson | 360/104 |
| 5,187,625 | 2/1993 | Blaeser et al. | 360/104 |
| 5,201,458 | 4/1993 | Hagen | 219/121.64 |
| 5,260,618 | 11/1993 | Dunfield et al. | 310/13 |
| 5,313,355 | 5/1994 | Hagen | 360/104 |

*Primary Examiner*—Geoffrey S. Evans
*Attorney, Agent, or Firm*—Flehr, Hohbach, Test, Albritton & Herbert

[57] ABSTRACT

A disc drive assembly constructed in a manner to avoid relative movement of the actuator arms relative to one another even under shock or other substantial forces comprises a flange, actuator arm supports, voice coil support and appropriate spacers, with a nut on the bottom of the pivot stack assembly supporting the above named components setting the relative position of these pieces relative to the pivot cartridge. Each above identified element of the stack is then laser welded to an adjacent piece in order to prevent rotation of any actuator arm. The pieces are laser welded at a curved edge of the part where the parts are rounded so that the adjacent edges lie very close to each other.

6 Claims, 2 Drawing Sheets

METHOD FOR MAINTAINING INTEGRITY OF A POSITIONER STACK USING A WELDING PROCESS

FIELD OF THE INVENTION

The present invention relates generally to disc drive systems and particularly to a method for assembling a positioner stack which supports the elements of the voice coil motor and actuator arm assembly of a disc drive.

BACKGROUND OF THE INVENTION

Disc drive units in general are known in the art for use in modern microcomputers such as personal and desktop computers and the like. In the most common form for which this invention is significant, such disc drive units comprise a so-called Winchester disc drive having one or more rotatably driven memory storage discs mounted within a substantially sealed disc drive housing, along with one or more electromagnetic heads for reading and writing data on appropriately prepared surfaces.

A disc drive unit of this type, referred to as a hard or fixed disc drive, is typically available as a compact package with the sealed housing on a rigid chassis frame together with circuit board carrying the necessary drive electronics for interfacing with other components of a computer system. Within the drive, one or more discs are rotated at a constant speed by a spindle motor. Data is stored on a plurality of tracks defined on the surface of the discs. As the discs rotate, actuator arms fixedly mounted on a pivot cartridge move the electromagnetic heads from track to track under control of a voice coil motor having a moving element supported from the same pivot cartridge. This pivot cartridge is supplied as a single integral assembly which is typically mounted into the base of the disc drive. The actuator arm or more typically arms are supported from the cartridge and extend from the cartridge toward the discs; a v-shaped assembly, extending in the opposite direction to the actuator arms, supports the coil for the voice coil motor. Assembly of the actuator arm assembly begins with the pivot assembly which includes the bearings about which the actuator arm will rotate and inner and outer sleeves therefore. A flange is at the top of the pivot bearing assembly; then the actuator arms are stacked on, together with an appropriately located coil support arm; a locking nut is threaded onto the bottom to hold all the above elements together by friction.

However, with reduction in size of disc drives, the pieces of the actuator arm and voice coil support have become smaller, thinner and lighter in weight. As such, it has become increasingly difficult to apply sufficient frictional force against the adjacent pieces merely by screwing the locking nut tightly down against the stack without damaging or torquing out of shape the adjacent pieces. Moreover, even as disc drives have become smaller and formed of lighter weight components, the need for more rapid accessing of the data stored in the discs by quickly moving the actuator arm to position the transducer it supports from track to track has become greater.

The motion of the actuator arm is accomplished by energizing the voice coil motor, and more specifically by passing a current through the coil supported by the v-shaped assembly from the same pivot cartridge which supports the actuator arms. This actuation both begins and ends very quickly, resulting in the imposition of significant forces to both the coil and the arm as it is accelerated and decelerated. Yet in spite of the magnitude of the forces, it has become even more critical that there is absolutely no motion of the coil and/or arms relative to one another.

SUMMARY OF THE INVENTION

It is therefore an object of the invention to reliably assemble the actuator arms and voice coil motor support arm.

It is a further and related object of the invention to provide a means for establishing the physical relationship between the actuator arms and voice coil arm on the pivot cartridge and maintaining that relationship. It is a further object of the invention to define and permanently fix the relationship between the parts without providing an excessive loading force against the parts which might cause a distortional warping of the parts.

These and other objects of the present invention are achieved by forming the pivot stack assembly comprising flange, actuator arm supports, voice coil support, and appropriate spacers, and placing the nut on the bottom and tightening the nut to set the relative position of these pieces relative to the pivot cartridge, and then laser welding each piece of the stack to an adjacent piece in order to prevent rotation of any actuator arm support relative to any of the others. Further, the pieces on the ends of the stack are welded to the pivot cartridge to prevent rotation of heads relative to the limit stops. The process uses a laser welding technique, and preferably is done at an edge of each part where the parts are rounded so that the adjacent edges lie very close to each other.

The welded joints provide significant advantages over present stack design in that much higher forces are required move or dislodge the heads relative to one another; more consistent force is required to move the heads, as the yield strength of the welded joints is far more predictable than frictional forces. Finally, the weld strength is constant over the time and temperatures that the drive will experience.

Other features and advantages of the present invention will be more readily apparent in the following detailed description and dependent claims taken in conjunction with the drawings in which:

DESCRIPTION OF THE PREFERRED EMBODIMENT

Figure 1:
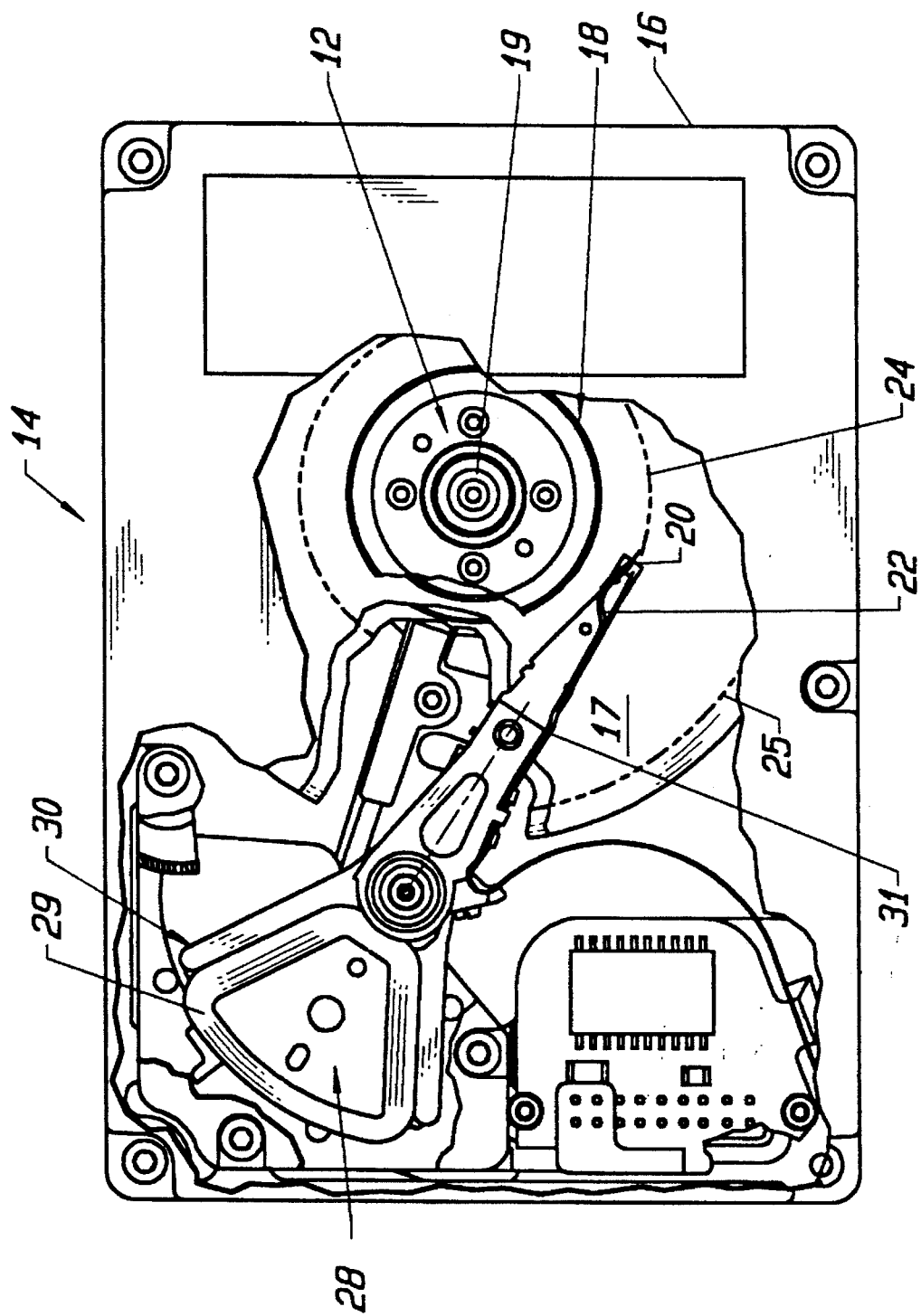
FIG. 1 is a top plan view of a disc drive incorporating the preferred embodiment of the present invention.

Referring to FIG. 1, the illustrative disc drive unit 14 is of generally standard construction except for the features to be pointed out below.

The disc drive is known in the computer industry to include a substantially sealed disc drive housing. This housing normally comprises a mating pair of housing sections, one of which is shown in this figure.

The disc or discs generally indicated at 17 are supported within the housing 16 or from the base casting 16 by disc drive spindle motor axis or hub generally indicated at 19. In this way, the rotating discs are operatively associated with one or more electromagnetic heads (not shown in this figure) which are utilized to read or write data in a manner known to those skilled in the art. The heads are supported at the end 20 of the actuator arm 22 for selective location of the associated head over any track (e.g. 24) on the surface of the disc in response to controlled energization of the voice coil motor 28 supported on the distal end 30 of the actuator arm from the heads whose location is generally indicated at 20.

It can immediately be seen by inspection of the figure that as the voice coil motor 28 moves the heads indicated at 20 from track to track over the surface of the disc, that the movement in any single stroke may cover much of the surface of the disc. The inner track is generally indicated at 24, the location of the outer track is generally indicated at 25. Therefore, relative to the size and head of the supporting actuator arm, the stroke or distance of travel in moving the head from one track to another can be considerable.

In order to meet the desired time-lag goals for accessing data on the surface of the disc, it is absolutely essential that the voice coil motor provide extremely rapid acceleration and deceleration of the actuator arm so that the head is immediately moved from one track to another in response to selective commands supplied to the coil 29 of voice coil motor 28. It is apparent that large acceleration and deceleration forces, relative to the size and weight and inherent strength of the elements of the actuator arm 31, and voice coil support fork 30 are created; thus it is very possible that in a disc drive comprising multiple actuator arms, that one arm could be displaced relative to another. This displacement would inevitably result in heads supported on a different actuator arm simultaneously being located over different tracks on different disc surfaces. To allow for this, servo data would need to be stored on every crack on every surface, or other complex electronic solutions adopted which would slow the processing of the data being accessed.

Figure 2:
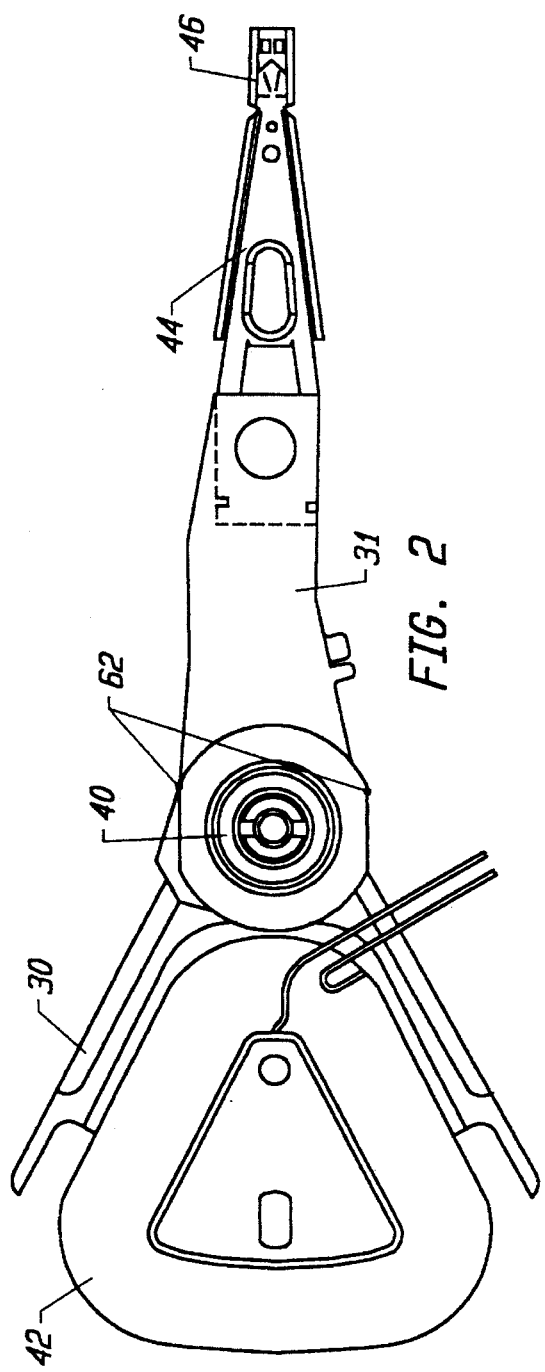
FIG. 2 is an enlarged top plan view of the actuator arm, voice coil support arm, and pivot stack of the present invention.
Figure 3:
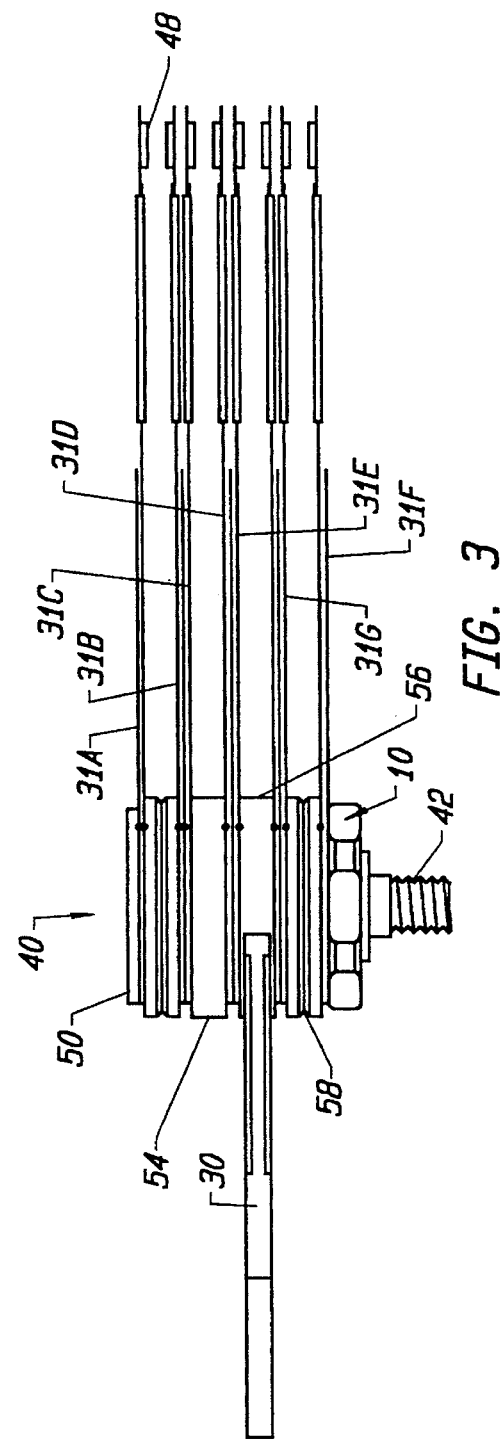
FIG. 3 is a side elevational view of the pivot stack actuator arm and voice coil arm assembly shown in FIG. 2.

In larger disc drives, to prevent such displacement of one actuator arm relative to another, it was known to simply impose greater torque by screwing more tightly the bottom nut (see FIG. 3) on the stack against the other elements of the stack so that the frictional forces between adjacent elements were high. However, in very small form factor disc drives where all the parts are small and of light weight, this could easily effect the preload on the bearings, or distort the shape of the pieces to which friction is being supplied. It is to overcome this problem that the present invention has been adopted. FIGS. 2 and 3 show an actuator arm and pivot stack assembly for supporting a plurality of actuator arms and their associated transducers. On both figures, the small dots which appear and which will be referred to in greater detail are the location of the welds which are incorporated to solidity and make structurally integral the pivot stack.

In FIG. 2, the elements which are essential to understanding this invention include the actuator arm 31 and the Y-shaped coil support arm 30, both extending out from the pivot cartridge generally indicated at 40. This cartridge is of known construction, and referring now to FIG. 3, includes a threaded stem 42 which is screwed into the base, and also includes the bearings for supporting the actuator arms and coil arm for rotation about the pivot point. Returning to FIG. 2, the coil support arm 30 supports a coil generally indicated at 42 which will cooperate with magnets (not shown) to form a voice coil motor which is selectively actuated to move the arm 31 from track to track. As the support arm moves, it carries with it the flexure 44, and slider 46 which supports a transducer shown more clearly at 48 in FIG. 3 and moves the transducer from track to track.

Referring now to FIG. 3, to understand the assembly of the complete pivot assembly, we have already identified the pivot cartridge 40. Beginning from the top of the pivot cartridge, it includes a flange 50 which has historically been used to hold the elements in place, followed by the first actuator arm 31A which supports the top most transducer 48 for cooperation with the top surface of a disc 17. After this support arm is placed, then a metal spacer ring to define the spacing between adjacent actuator arms is put in place. This spacer ring 52 is of a defined width; against the bottom of the ring rests two further actuator arm supports 31B and 31C for cooperation with the underside of the top disc and the top side of the next adjacent disc, respectively. These arms are followed by another spacer 54, and another pair of actuator arms 31D and 31E. Next follows the coil support arm 30 with its associates support arm block 56; this is of the same thickness as the spacer rings and functions as a spacer between actuator arm 31E and the next pair of actuator arms 31F, 31G. Next follows another spacer, 58, and a final actuator arm 31F. Obviously more or fewer actuator arms could be incorporated in this stack. At the bottom of this stack is a nut or ring 60 which is placed on the bottom of the stack and screwed tightly against the stack to create a frictional relationship between the elements of the stack in order that they will retain their functional positional relationship. However, as defined above, it is critical that the heads cannot move to one another. Moreover, it is readily apparent from an inspection of FIG. 3, that excessive tightening of the nut 60 could easily cause of change of the preload in the bearings incorporated in the pivot cartridge. On both sides of the stack, and at a point, typically either on a curved surface or immediately adjacent to a curved surface, where the curvature of the actuator arms space a ring flange arm immediately adjacent to each other. Thus, in this particular sequence, the welds 62, indicated by the dots which appear down the side of the stack shown in FIG. 3 first are used to weld the top arm to the flange which is a part of the pivot cartridge, the top arm 31A to the flange which is a part of the pivot cartridge; next the arm is welded to the spacer 52. Then follow welds of the spacer 52 to actuator arm 31B and of actuator arm 31C to the next spacer 54. Spacer 54 is welded to arm 31D, the arms 31D and E are welded together and arm 31E is welded to the spacer block 56 which supports the actuator coil arm 30. In this particular example, the final pair of actuator arms is welded to adjacent spacers 56 and 58, and finally the bottom actuator arm is welded to the last spacer 58 and nut 60 completing a complete integral assembly which does not have parts which rotate relative to one another.

By virtue of this simple expedient of laser welding of the parts to each other and to the pivot cartridge, the force required to move the heads is significantly increased. A more consistent force is required to move the heads, the yield strength of the welded joints is much more predictable than frictional forces, and therefore, the amount of power which may be applied to the actuator arm assembly to change the location of the arm from track to track may be very reliably selected. Finally, the weld strength is constant over the time and temperatures that the drive will experience.

Other features and advantages of the present invention will be apparent to those skilled in the art by the description of the preferred embodiment above. Thus, the following claims are intended to cover modifications and equivalents falling within the scope of the present invention,

What is claimed is:

1. In a disc drive comprising a base plate, a spindle motor mounted in said base plate and supporting at least one disc for rotation, and at least one actuator arm supported by a pivot cartridge on said base, each said arm having at least one transducer mounted thereon for selective cooperation with tracks on an associated surface of said at least one disc for reading or writing data thereon, an element of a voice coil motor directly connected to said at least one actuator arm and responsive to commands for moving said at least one arm and said at least one transducer from track to track, said pivot cartridge supporting thereon an actuator arm support for each surface of said disc on which data is to be written or read, spacers for separating each arm support from an adjacent arm support wherever space must be left for a disc, and a motor support for supporting said motor element and incorporating said motor element into said actuator arm assembly so that energization of said voice coil motor causes corresponding movement of said arm, a method of assembly comprising stacking said actuator arms, said spacers and said voice coil motor elements on said pivot cartridge, threading a nut onto the bottom of said cartridge to press each of said elements firmly against an adjacent one, executing a sequence of welds attaching each and every one of said voice coil motor elements, actuator arm supports, spacer, and flange integrally together so that regardless of shock and motor actuation forces, said actuator arms are not displaced one relative to another.

2. A method of assembling as claimed in claim 1 including the step of locating said welds vertically aligned one relative to one another and on both sides of said stem on opposite sides of said actuator arm support and said motor element support.

3. A method of assembling as claimed in claim 1 including the step of locating said welds on a curved surface of each of said elements in said pivot assembly.

4. A method of assembling as claimed in claim 1 said motor element supports comprise a support for the coil of a voice coil motor.

5. A method of assembling as claimed in claim 1 including the step of reading a nut screw on the bottom of said stem to hold said actuator arms securely in place.

6. The method of claim 1 wherein said welding is accomplished by laser welding.

* * * * *